(12) United States Patent
Chrysanthakopoulos et al.

(10) Patent No.: US 8,555,242 B2
(45) Date of Patent: *Oct. 8, 2013

(54) DECENTRALIZED SYSTEM SERVICES

(75) Inventors: Georgios Chrysanthakopoulos, Seattle, WA (US); Henrik Frystyk Nielsen, Hunts Point, WA (US); George M. Moore, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/353,957

(22) Filed: Jan. 19, 2012

(65) Prior Publication Data

US 2012/0144365 A1    Jun. 7, 2012

Related U.S. Application Data

(63) Continuation of application No. 11/325,661, filed on Jan. 4, 2006, now Pat. No. 8,122,427.

(51) Int. Cl.
*G06F 9/44* (2006.01)
*G06F 15/16* (2006.01)
*G06F 15/76* (2006.01)

(52) U.S. Cl.
USPC .............................. 717/104; 709/201; 712/28

(58) Field of Classification Search
None
See application file for complete search history.

(56) References Cited

U.S. PATENT DOCUMENTS

| | | |
|---|---|---|
| 5,850,517 A | 12/1998 | Verkler et al. |
| 6,269,473 B1 | 7/2001 | Freed et al. |
| 7,774,750 B2 | 8/2010 | Chrysanthakopoulos |
| 2002/0099713 A1 | 7/2002 | Fernandez et al. |
| 2003/0097485 A1 | 5/2003 | Horvitz et al. |
| 2003/0131073 A1 | 7/2003 | Lucovsky et al. |
| 2003/0182467 A1 | 9/2003 | Jensen et al. |
| 2003/0195853 A1 | 10/2003 | Mitchell |
| 2003/0217140 A1 | 11/2003 | Burbeck et al. |
| 2005/0125486 A1 | 6/2005 | Chrysanthakopoulos et al. |

OTHER PUBLICATIONS

Author Unknown, "DCE Motif Bank Demo," Jun. 1, 1994, IBM Technical Disclosure Bulletin, vol. 37, Iss. 6A, pp. 129-130, TDB-ACC-No. NA9406129.

*Primary Examiner* — James D Rutten
(74) *Attorney, Agent, or Firm* — Woodcock Washburn, LLP

(57) ABSTRACT

A Decentralized System Services (DSS) architecture defines a framework for building fault-tolerant distributed applications across decentralized and heterogeneous systems. DSS enables "complexity through composition" by defining distributed designs as compositions of limited function and observable services which may be quickly and dynamically assembled to perform higher level functions. DSS defines a standardized interaction between distributed services using sessionless, asynchronous communications with explicit failure semantics. Accounting for latency, failure and state management all become a natural part of the design process. DSS includes a runtime implementation for managing concurrent services—the Common Concurrency Runtime (CCR), a protocol for service interactions—the Web Services Application Protocol (WSAP), and a set of required service behaviors which provide for composibility, location independence, and fault tolerance—Distributed Protocol Oriented Programming (DPOP). DSS also includes a set of base level infrastructure services which make it easy to communicate, secure, distribute, debug, and store content across devices.

20 Claims, 7 Drawing Sheets

DECENTRALIZED SYSTEM SERVICES

CROSS-REFERENCE TO RELATED APPLICATION

This application is a continuation of U.S. patent application Ser. No. 11/325,661, filed Jan. 4, 2006, now U.S. Pat. No. 8,122,427 issued Feb. 21, 2012, the contents of which are incorporated by reference herein in its entirety.

BACKGROUND

Processor trends are inevitably moving towards multi-core parallelism, while processor clock-speed trends are slowing considerably in the face of physical limitations. Increased application performance will therefore require highly multi-threaded implementations in order to take advantage of processors which are faster only through parallelism.

Also, computing devices will continue to be smaller, cheaper, and more numerous. So-called "edge" devices, such as cell phones, PDA's, and portable media players, for example, are all becoming fully functional computing devices with high levels of storage and network capabilities. Interconnecting this fabric of "rich peer" edge devices creates new opportunities for future applications and business models.

Both of these trends require that future applications are concurrent. The second trend also forecasts that applications will increasingly be distributed and spread across multiple administrative and trust boundaries. Scenario examples from this domain include web applications, business process orchestration, telecommunication applications (e.g., email, IM, VoIP), multiplayer gaming, peer-to-peer file sharing and streaming experiences, etc.

Designing for concurrency is a difficult task as interactions with other processes are unpredictable, with non-deterministic timing. Designing for distribution is further complicated by heterogeneous systems, non-deterministic communications and partial failure. Distributed systems also must account for scale, reliability, and mobility. Designing for decentralization complicates the design process further as it puts demands on interoperability and extensibility across trust domains.

U.S. patent application Ser. No. 10/718,199, filed on Nov. 20, 2003, discloses a decentralized operating system that includes services for representing resources. Each service includes a designation primitive, a behavioral primitive that comprises a unilateral contract, and a communication primitive. The system further includes a decentralized operating system for orchestrating the services executing on a computer system so as to control and coordinate resources.

Such a system may include a networked system for networking computer systems. The networked system includes a first decentralized operating system executing on a computer system. The first decentralized operating system includes a first distributing kernel for designating uniform resource identifiers for a first set of services and distributing messages among the first set of services. Each service includes a unilateral contract. The unilateral contract expresses behaviors of the service.

Such a system may also include a decentralized operating system that includes a distributing kernel. The distributing kernel includes a URI manager for managing names. Each name constitutes a unique designation of a service at the computer system so that the service can be discovered. The system further includes a message dispatcher for forwarding messages among services. Each service is identifiable by a name managed by the URI manager and associated with a unilateral contract.

U.S. patent application Ser. No. 10/718,199 further discloses a method that may be implemented on a computer system. Such a method may include assigning a first unique name to a first service upon request. The first service includes a first unilateral contract for expressing the behaviors of the first service. The method further includes distributing a message to the first service using the unique name. The message is sent by a second service having a second unique name. The second service includes a second unilateral contract for expressing the behaviors of the second service.

SUMMARY

A decentralized system services (DSS) architecture defines a framework for building fault-tolerant distributed applications across decentralized and heterogeneous systems. Distributed systems suffer in comparison with localized and sequential systems from three major issues: latency, partial failure, and state management (i.e., concurrency complexity). Distributed designs may be defined as compositions of limited function and observable services which may be quickly and dynamically assembled to perform higher level functions. A standardized interaction may be defined between distributed services using sessionless, asynchronous communications with explicit failure semantics. In this way, accounting for latency, failure, and state management all become a natural part of the design process.

A decentralized system services (DSS) architecture defines services as the basic building block for processing and state management. DSS defines how services are named, discovered, and interact with one another in a robust and scalable way.

DSS provides a simple, uniform model for distributed processes with clear semantics. DSS promotes concise, specific and limited functionality per service and a simple, consistent, and observable interaction protocol. This enables composition into diverse and complex applications with high reuse of individual services. For example, specific capabilities such as scheduling, leasing, time management, and directory are all created as services. This enables their easy reuse for composition with other services for building applications.

DSS aids the programmer in creating distributed, concurrent applications by providing a runtime for implementing message-based and concurrent services, a set of core services that implement fundamental and common functions, and guidelines for successfully designing and programming distributed applications.

This disclosure builds upon the disclosure of U.S. patent application Ser. No. 10/718,199 and includes at least the following new and additional concepts: Distributed Protocol Oriented Programming ("DPOP"), which is a programming methodology around composibility, state management, location independence and failure modes; local and remote node discovery; lineage and providence of a service; scope and context (e.g., spatial distance, communication latency, namespace locality, relational distance, etc); resource reclamation (a.k.a., garbage collection) via a leasing infrastructure. This disclosure also provides details with respect to certain core services, such as, scheduler, constructor, directory, nodedirectory, typedirectory, forwarders, subscription manager, manifestloader, compatibilityvalidator, logging, and tracing.

DETAILED DESCRIPTION

Figure 1:
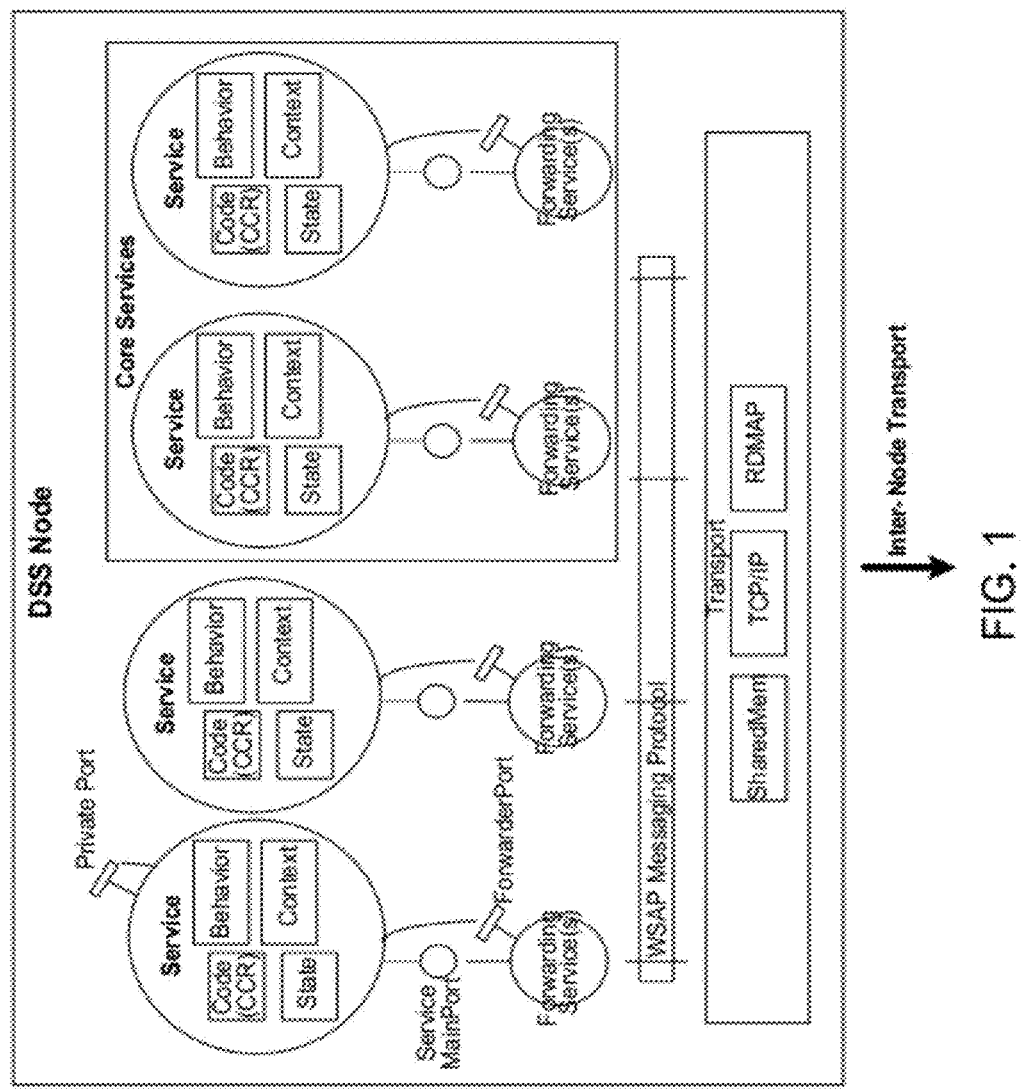
FIG. 1 is a functional block diagram of an example DSS node.

Definitions of Certain Terms as Used Herein

As used herein, the term "parallelism" refers to the ability to execute processes simultaneously for the purpose of increasing performance. Parallelism is often driven by performance requirements. In some cases, it may be invisible to programmer The term "concurrency" refers to the ability to engineer multiple processes for independent execution. Concurrency may be used for performance gain and/or execution structure. Concurrent processes may or may not use parallel execution.

A "DSS service" is an execution scope with globally unique identity and observable state, including a context for relationship with other services. A DSS service interacts with its environment via strongly typed messages.

A "DSS service state" is the current state of a service as it relates to its function. Such a state does not include incidental information that may be recreated.

"DSS service context" refers to the subset of a service state that identifies associations with other services.

A "DSS application" is a collection of several composed services executing concurrently to accomplish some desired set of goals. DSS applications can span any number of network, trust and administrative domains. Whereas DSS services are very strictly defined, a DSS application is a loose and potentially dynamic association defined by relationships (see DSS service context).

A "DSS node" is a shared execution environment for a group of service instances. Nodes are not a first class entity in the DSS architecture, but provide an environment for services to be executed and supported. DSS nodes may include core services, such as construction, discovery/directory, persistence, loading, etc. The scale of a DSS node is typically that of a traditional user-mode OS process within a discrete compute machine. A machine may include one or more nodes.

DSS Overview

DSS enables the features and meets the challenges of distributed systems through a consistent model of process and state management. A DSS service has a unique name and is globally addressable. State is always maintained within a DSS service and can be atomically accessed by other, authorized services. Finally, a DSS service can describe its functional behavior. By querying a service's behavior and current state, a complete snapshot of the service can be taken. These attributes mean that state can be easily accessed, rapidly relocated, and duplicated.

DSS specifies coding practices which build on the expectation that communications are unpredictable. Asynchronous message-passing and continuations are almost exclusively used for service interactions. DSS coding practices use simple request-response message patterns to avoid complex long-running dependencies between services. Within a service, the DSS Common Concurrency Runtime (CCR) provides a set of primitives to aid with concurrent design.

The DSS approach to process and state management enables application scale-up and scale-out by ensuring that all services (and therefore all states) can be relocated, replicated, cached, and monitored. Relocation in turn enables load balancing to improve either computational or data access performance. DSS coding practices also encourage that services are relatively small (e.g., on the order of an OOP class) to provide a proper granularity for mobility. For example, in an insurance data processing scenario, every customer file would be represented as its own service with the customer data as the service state. For example, a billing validator service would iterate through a list of the customer file services. To scale this scenario, several options are available. First, if processing load is an issue, an additional billing validator service could be created, perhaps on another machine. The list of customer files would be quickly split between the two processes and iteration can continue. Global naming and addressing mean that the location of the customer file service relative to the billing validator service is largely irrelevant. Next, if data access presents a problem, the customer files can quickly be moved or replicated to another location.

To ensure location independence, DSS services are uniquely named and globally addressable. DSS provides a set of core services for message passing over multiple transports. Predicated on access restrictions, any service can easily communicate with any other service.

DSS uses a subscription model with leasing services to manage resource usage. Clients will subscribe to a resource service, which will then enlist a leasing service. Clients which do not renew the lease in time may have their subscription dropped. When no subscriptions remain, the resource service is free to self-terminate. This may be referred to as resource reclamation.

DSS uses standardized protocols, based on XML and SOAP to enable a broad range of service implementations. DSS services may be written using the CCR (described below), and may be written entirely in C# and run on an unmodified "Whidbey" CLR 2.0 environment. However, because the focus is on protocols, programmers can use many different languages to build concurrent programs interacting with DSS. Each language has its own characteristics and target audience in this environment, for example some languages might allow more flexibility or formal verification than others, but in the end programmers would have the freedom of choosing the appropriate language for their current task.

The DSS Common Concurrency Runtime (CCR) enables concurrent design by providing a set of primitives for supporting sending and coordination of asynchronous messaging. The functionality of the CCR is described in detail below, and in U.S. patent application Ser. No. 11/184,285.

DSS enables distribution by defining a Web Services Application Protocol (WSAP) and providing a model for service interaction, including naming, addressing, and discovery.

As programmers may be faced with creating ever-more complex designs, DSS enables complexity through composition by moving distributed design towards limited function, simple, and robust processes that may be quickly and dynamically assembled to higher level functions. Realizing that successful reuse is the greatest challenge in composition, DSS focuses on three areas to ease composition between services: granularity, behavioral description, and interaction.

First, DSS services are intended to be small, with limited function. This means that more services must be enlisted to achieve a given functionality, but also makes an individual service more general purpose and therefore usable in more cases.

Next, DSS services are self-describing. By this, it is meant that a service can be queried to determine its behavior. Coupled with a compatibility service, this means that services can discover other local or remote services and create successful dynamic compositions.

Third, service interactions are constrained to a simple, yet complete, protocol. The reduced set of actions in the DSS protocol, with strict rules on safety and idempotency, eases composition by minimizing the operations that services must understand to communicate with one another.

DSS provides a framework, tool chain, and patterns of good coding practice that makes this task easier. This includes highly standardized interaction between distributed processes, a strong emphasis on stateless, asynchronous communications with explicit failure semantics, and an explicit emphasis on process state and context as distinct from function or implementation. One of the overarching assertions of the DSS is that, rather than attempting to hide the challenges that distributed systems incur, the programmer must account for them quite explicitly in the design. While this does require more time to be spent upfront in the design phase, this front-loading of good design practices tends to pay off later in greater agility and manageability of the resulting application. The DSS infrastructure also makes this task easier. In this way, accounting for latency, failure, and state management all become naturally explicit in the design process.

DSS addresses faults at many levels. At the application level, the DSS service architecture ensures that services can be easily relocated and duplicated by ensuring that service behavior and current state is easily observable. Services may also replicate themselves and maintain synchronization across multiple copies by leveraging DSS protocols. These mechanisms enable reliability via checkpointing, rollback, and failover of services. Between services, DSS leverages the SOAP communication model to specify how message failures will be propagated and managed. Within a service, the DSS CCR provides primitives for handling of failures, including separate processing of faults and timeouts.

Mobility is important for relocation, reliability, and load-balancing. The DSS service state model provides a clean mechanism for mobilizing services as needed.

While DSS enables the creation of parallel processing applications, it should be understood that automated "implicit" parallelism need not be a function of the DSS. Accordingly, programmers must be explicit in their design of parallel structures and processes when using the DSS.

DSS includes a runtime implementation for building concurrent services, i.e., the Common Concurrency Runtime (CCR), a protocol for service interoperation, i.e., the Web Services Application Protocol (WSAP), and a set of conventions and recommendations for creating distributed applications as compositions of autonomous services, i.e., Distributed Protocol Oriented Programming (DPOP). DSS implementations may also leverage a set of core services that provide basic functionality common to all services.

FIG. 1 is a functional block diagram of an example DSS node. As shown, a DSS node may include a plurality of services. DSS services may be created using the CCR. The CCR may be implemented as a library using the C# language and supports building of concurrent services through primitives that ease asynchronous message passing and coordination. The DSS CCR is described in greater detail below.

DSS services interact with each other using messages conformant to the WSAP protocol. All input and output messages used by a service for interactions with other services are defined as sub-types of this protocol. WSAP employs a message based request-response model, where each request is termed a WSAP "action." WSAP actions are state-oriented, meaning that a message is typed as to how it will affect the state of the targeted service. WSAP message exchanges, however, are stateless, meaning that after the response to a message has been received, no further communication context exists. The DSS WSAP is described in greater detail below.

DPOP embodies a set of programming styles and practices that enable robust distributed design. The DPOP model defines how to construct complex applications from simple services, how to manage state across applications. DPOP includes conventions for naming, addressing and discovering services in order to successfully construct larger applications. Finally, DPOP recognizes that faults and timeouts are common in distributed environments and proposes how to accommodate failure in a distributed design. DPOP is described in greater detail below.

DSS includes a set of core services which provide a starting point for programmers to build applications. DSS core services may be classified as "fundamental," where they are essential to the functionality of other services, or "common," where they are not strictly essential, but provide functionality that many applications may leverage. Some of the fundamental services provided by DSS include: scheduler, directory, time management, and transport forwarders. Common services provided by DSS include subscription management, leasing, and debugging. The DSS Core Services are described in greater detail below.

DSS Architecture

Figure 2:
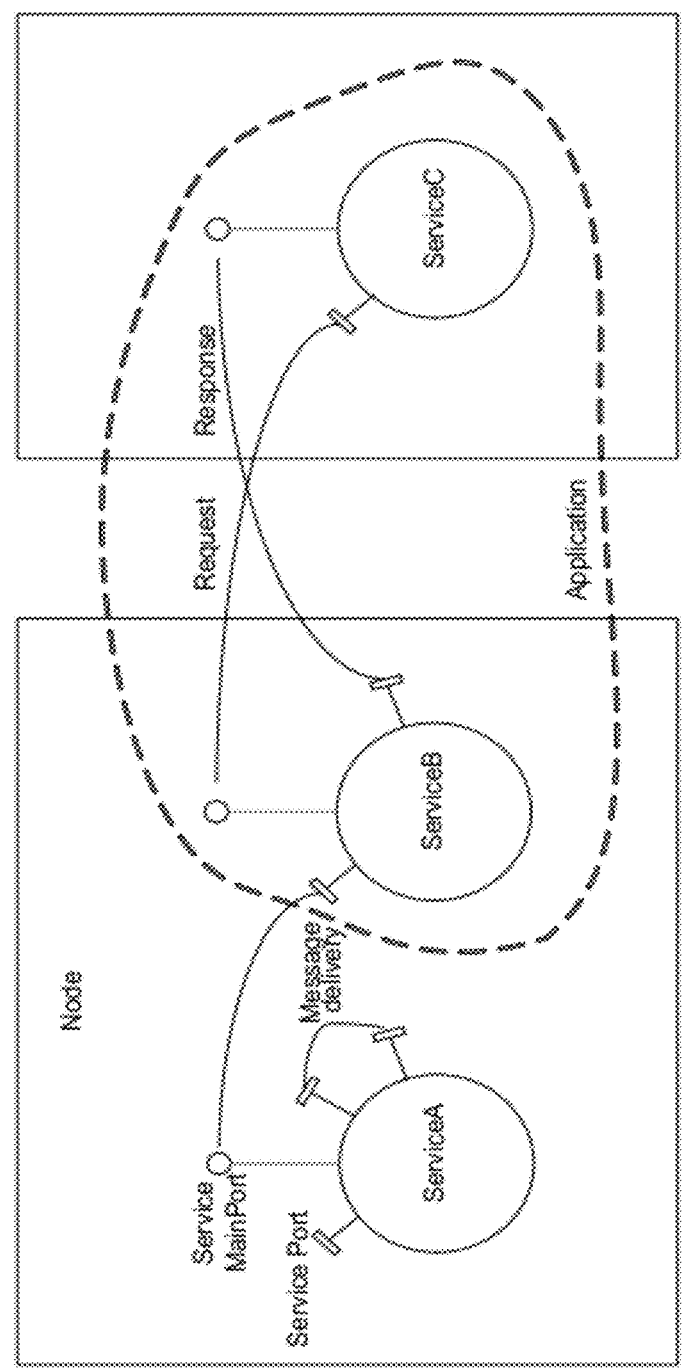
FIG. 2 is a functional block diagram of an example DSS application.

A DSS application, depicted in FIG. 2, is a composition of services. Services communicate with each other solely via strongly typed messages. Messages between services adhere to a protocol which defines a small set of state-oriented actions such as CREATE, INSERT, DELETE, and SUBSCRIBE. Services may be written in a style which enables a high degree of concurrency, using the facilities of the CCR. Core services may be written in C#, but as the CCR may be implemented in CLR, any CLR compatible language may be used.

The DSS architecture may be described in terms of three levels of abstraction. At the lowest level, DSS defines how services are designed and how an individual service interacts with itself. This is the domain of the CCR. At the next level, DSS defines how services interact with each other. This includes the DSS WSAP protocol as well as programming practices which enable distribution. At the highest level, DSS defines how multiple services are composed to form larger applications and proposes conventions for successfully building distributed apps. This is DPOP.

In DSS, any group of services may be termed an application. Programmers create applications by defining a particular composition of underlying services. These compositions are often late bound, meaning that required services can be discovered and activated by the application on an as needed basis. The compositions are also loosely coupled, meaning that services do not maintain a hidden context in their relationships with each other. This enables services to quickly shift to other relationships in case of failure or changing application needs. DSS applications are described in greater detail below.

Nodes are not a first class entity in the DSS architecture, but represent an execution environment for services. A node includes a minimum set of core services that other services can rely on for basic functionality. These core services may include Scheduler, Directory, Transport Forwarders, Time services, Security, Debugging, etc. These services are described in greater detail below. The scale of a node is typically a single, physical machine, though multiple nodes can be hosted on a single machine, and a single node may run across multiple machines. When DSS is executing on a traditional operating system ("OS"), a node will typically correspond to one machine "process" and will use as many OS worker threads as there are CPUs.

Services are the fundamental execution unit in DSS. A service is hosted within a node. DSS applications are created as compositions of services running in any network environment across any trust domain.

A DSS service may have an identity, i.e., the globally unique reference to the service instance, a behavior, i.e., the definition of the service functionality, a service state, i.e., the current state of the service, and a service context, i.e., the relationships the service has in place. Services are described in greater detail below.

Ports are used within DSS services for all communication. A service may have any number of private ports which it uses for concurrent communication with itself and for creating outbound connections to other services. Storing messages in ports is the fundamental technique for serializing access to state in DSS. A service has exactly one "main port" where it receives inbound messages from other services.

Services are the fundamental building blocks of DSS as they are the only means of providing execution and state. A service provides functionality by responding to typed inbound messages for which it is designed to listen. A service may react to an inbound message by modifying its internal state, sending new messages to itself or to other services, and responding to the original message. Services maintain their current state and can present it atomically on demand. Services use messages to control serial access to state objects as necessary to maintain invariants. Services therefore function as a set of overlaid state machines with typed I/O synchronized on access to service state.

A DSS service instance may be identified by exactly one Uniform Resource Identifier (URI), which must be globally unique and should be dereferencable by other services.

DSS may also provide an "alias" relationship that indicates that two services share the exact same execution scope. While an implementation may choose to optimize the alias relationship by functionally exposing a single execution context with multiple identifiers, logically there is always a 1:1 relationship between a service and an identifier. Services that are logical aliases of each other will indicate the relationship in their service context.

DSS services may be described abstractly by the behavior they exhibit to other services. The service behavior description includes the types of messages that are used in interacting with the service (i.e., static typing) as well as ordering rules for the flow of those messages (i.e., dynamic typing). Message types are defined using XML Schema and conform to the DSS WSAP. WSAP messages define state-oriented actions and provide for service creation and termination, service behavioral type query, state access and modification, and eventing. The WSAP protocol is described in greater detail below.

Message ordering rules may be defined by a service contract that a service will produce upon request. A service contract may be identified by a URI. In fact, a service contract itself is a service, which can be queried to understand how the conforming service behaves.

The service state is that which is required to describe the service instance at a particular time. For example, a queuing service would expose the current value of the queue as the service state. Service state will usually not include data which can easily be recreated from other state information. WSAP actions such as INSERT, DELETE, and UPDATE will modify service state in a service-dependent way. The WSAP action GET will return the service state atomically.

Figure 3:
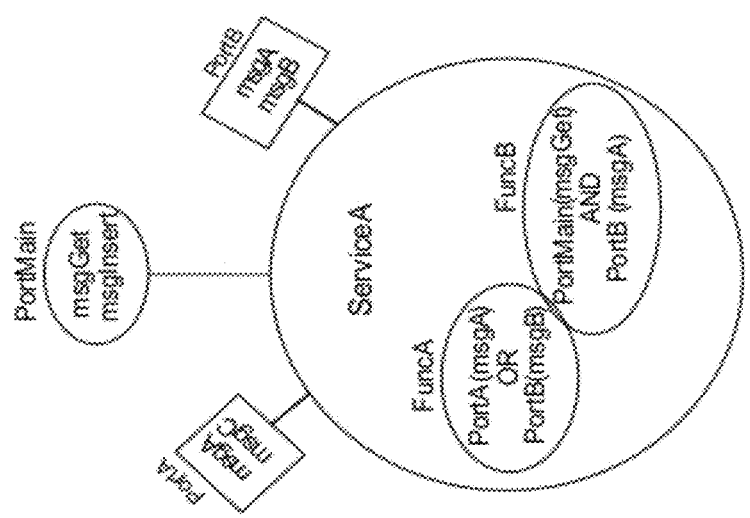
FIG. 3 depicts an example service implementation.

The relationship of a service with other services is called the service context. This information is often useful for understanding how the service interoperates with its environment and may be necessary if a service is to be relocated. DSS captures this information in the form of a name-value list. Names are namespace qualified and define the semantics of the relationship. Values are the URI's of the partner services. This goes to the lineage and providence of a service, which may be important in understanding a great deal of the scope and context of a given service Implementation details that do not functionally impact observable behavior may be hidden. In other words, only the message protocol patterns "on the wire" matter. The internal implementation of a service can be written in any programming language running on any operating system. DSS services are implemented using the CCR which is in turn implemented with the CLR. The CCR enables rapid development of concurrent services suitable for DSS applications. FIG. 3 depicts an example service implementation.

Service ports are used for all communication within a service and are fundamental to making DSS services concurrent. A service can create any number of ports for its use. Ports are typed at their creation with the types of messages that they will accept. Messages are delivered to a port using the CCR POST method, which returns control to the calling context immediately. That is, message delivery is asynchronous. Services receive messages on ports by associating one or more ports and one or more messages with a continuation method. In the simplest case, a service will specify that if a message of type "msgA" is received on port "PortA", then continuation method "FuncA" should be called and passed the message as a parameter. As described in greater detail below, the CCR provides primitives for more complex coordination.

Every service may have exactly one "main port" that is associated with an externally addressable URI. All messages sent to the service URI will arrive at this port. The DSS core Forwarder services provide the functionality of connecting a service to a range of transport interfaces and thereby expose the service's main port to other services on the same or other nodes. Forwarder services are internal to the DSS implementation. Forwarders are described in greater detail below.

DSS services are written in a style to encourage concurrency. This enables services to effectively use underlying parallel resources (such as multiple CPUs) and also encourages services to behave in a manner which is conducive to distributed systems. The CCR provides the mechanism for concurrent operation of DSS services. The primary elements in the CCR are ports, messages, and coordination primitives. All core tasks, including scheduling, resource management, synchronization, etc. are managed with these elements. Typed messages are used for all communication within and without a service; ports are used for sending and receiving messages; coordination primitives determine how and when message reception will trigger continuation methods. When programming with the CCR, services never create a thread, instead, services specify an association between messages and continuations and the core scheduler service will switch contexts automatically in response to message flow. DSS services do not use locks or mutexes for synchronization. Rather, serial access is enabled by a token-passing style using messages. Reader-writer constructs can also be created with the CCR for more complex synchronization. Service failures, such as errors, exceptions and timeouts also use the port, message and continuation pattern.

The CCR provides several primitives for services to coordinate messages, ports and continuations. Messages are sent to ports using the POST method:

```
Port<int> p = new Port<int>{ };
p.post(13);
```

The CCR ACTIVATE method specifies a context for triggering continuation methods within a service when messages are received at ports. Activate methods may include a single port continuation specifier as shown below. This code will trigger once when port p receives an int.

```
Port<int> p = new Port<int>{ };
    activate(
        p.with(MyIntHandler)
    );
    void myIntHandler(int theInt) {
        Debug.WriteLine("Here is the int: " + theInt);
}
```

Activations may trigger multiple times. The following code will trigger whenever port p receives an int:

```
Port<int> p = new Port<int>{ };
    activate(
        !p.with(MyIntHandler)   //note "!" for repeated trigger
    );
    void myIntHandler(int theInt) {
        Debug.WriteLine("Here is the int: " + theInt);
}
```

Activations may include a list of desired continuations, for brevity. The following code will indefinitely accept ints and strings at port p and trigger respective continuations.

```
Port<int, String> p = new Port<int, String>{ };
    activate(
        !p.with(MyIntHandler),
        !p.with(MyStringHandler)
    );
```

Activations may also include any combination of CHOICE, JOIN and INTERLEAVE constructs. The CHOICE construct specifies that exactly one sub-element will trigger a continuation. The ports specified can be the same port (using different message types) or two different ports. The following example uses a single port p and specifies that it will trigger if an int arrives or if a string arrives. In either case, the appropriate continuation method will be called. It is guaranteed that only one continuation will be called even if the port receives an int and a string.

```
Port<int, String> p = new Port<int, String>{ };
    activate(
        p.with(MyIntHandler) //generics are used to bind this to msgs
        of type int
            |   //choice construct, acts as "OR"
        p.with(MyStringHandler)
    );
```

```
void MyIntHandler(int theInt)
{
    //...
}
void MyStringHandler(String theString)
{
    //...
}
```

A very common use of CHOICE is to set up continuations for responses to a request. For example, when a message request is sent, the response may have various success or failure results. One possible failure includes not receiving a response in a timely manner. CCR manages this with use of CHOICE and the Timeout construct.

The JOIN primitive specifies that a continuation should be activated when a combination of messages has arrived at specified ports.

```
Port<int > p1 = new Port<int>{ };
    Port<String> p2 = new Port< String>{ };
    activate(
        join<int,string>(p1,p2).with(myIntAndStringHandler)
    );
```

The continuation method "myIntAndStringHandler" will be called when port p1 receives an int and port p2 receives a string. The continuation will be given the int and string messages as parameters.

The INTERLEAVE primitive supports reader-writer mutual exclusion rules. Interleave consists of two groups, called "exclusive" and "concurrent" which each contain choice or join continuation specifiers. In an interleave primitive, members of the exclusive group must be executed exclusive of any other continuation in the interleave (either in the exclusive or concurrent set). Alternatively, any number of concurrent members may be executed at the same time. For example, the programmer can specify that a continuation which handles write access to an object can only be called if no other writers and no readers are accessing the object. However, the continuation for read access could be called multiple times as long as there are no writers accessing the object.

```
Interleave(
    exclusive ( !port1.with(WriterFuncA) | !port1.with(WriterFuncB) ),
    concurrent( !port2.with(ReaderFuncA) | !port3.with(ReaderFuncB) )
);
```

The CCR communication primitives enable efficient and consistent operations when programming with messages. Further details on port interaction primitives can be found in U.S. patent application Ser. No. 11/184,285.

A DSS service interacts with itself by sending typed messages to its private ports. The CCR primitives are used for service message handling and concurrency control. Where a request-response model is appropriate, the CCR enables this by allowing references to ports to be sent in messages. Using this, a service can request an action to be performed (concurrently) by one of its methods, while also specifying where the response should be sent. The sending routine can then set up how the response should be managed.

EXAMPLE

```
//the message class, includes response port
Class rqstMsg {
    String theRqst;    //message payload
    Port<String > pTheRsp;   //port for the response
};
//the request port - known by client and server side
Port<rqstMsg > pRqst = new Port<rqstMsg >{ };
//===========================================
//The client side of the interaction (the requestor)
//===========================================
//create the message and response port
rqstMsg msg = new rqstMsg{ };
Port<String> pRsp = new Port<String>{ };
msg.theRqst = "Help";
msg.pTheRsp = pRsp
//send the message
pRqst.post(msg);
//prepare for response
activate(
    pRsp.with(myResponseHandler)
    );
void myResponseHandler(String theRsp)
{
    Debug.WriteLine("got this response: " + theRsp);
}
//===========================================
//The server side of the interaction
//===========================================
// may be in another class of the service
// but must know the port it is listening on for rqsts
activate(
    pRqst.with(myRqstHandler)
    );
void myRqstHandler(String theRqst)
{
    theRqst.pRsp.post("No");   //reply using the response port in the msg
}
```

For communication within a service, messages may be of any type. For interaction with other services, messages must conform to the WSAP protocol by subtyping from the WSAP message actions. WSAP messages are defined using XSD schema. WSAP and service interoperation are discussed in greater detail below.

Whenever possible, when a service is initiating behavior upon itself (for example, if it wishes to update its state), it should use its own schema and send messages to its main port. In this case, the service would send a WSAP UPDATE to itself. This serves two purposes. First, it makes intra-service actions consistent with external actions upon the service. Second, it permits observation of service behavior by watching messages at the main port. Communication between DSS services is described in greater detail below.

A DSS service's state is defined by the minimal data required to represent the current service instance. Partially completed transactions are not considered part of the service state. That is, if we assume that clients will tolerate a failed request, then we can capture the current service state as a function of transactions that have been completed with the service, ignoring transactions "in progress." This greatly reduces the information needed to describe the current state of the service.

Note that arbitrarily fine-grained transaction processing may be designed in DSS by defining services to manage state and processing of sub-tasks. For example, if a larger transaction includes a list of elements to be processed, the target service may enlist a "Workqueue" service to maintain this list and its completion status. In this way, any of the services may be stopped and restarted without losing significant work.

Within services, state consistency is managed by serializing access to the internal state object. For example, services will often define a unique Port which is used to store their state object. The service will then create a message with the state object in it and post the message to the port. Service handlers will then specify that they should be scheduled when a specific triggering message has arrived and the state object is available. The handler will then return the message to the port when it no longer needs access to the state. The CCR join and interleave primitives are used to support this mechanism.

If the service state is relatively large, it may be appropriate to factor it into several elements which are individually stored as messages. Activations may then specify which combination of state elements are required for the continuation. The continuation will only be called when all required elements are available (all message types are in the port queue). This serial access of the state element(s) ensures atomic access, preservation of invariants as well as efficient operation. Note that service state should always be cloned when passed to another service. That is, immutability must be ensured as a pass-by-value mechanism.

The context of a service is important to understand how the particular instance of the service is operating. DSS represents context as relationships between service instances. Context may be used to determine features such as service ancestry (which service was used to construct this service). This would enable the creation of co-located services when that is desired.

Services maintain a list of other services that they are engaged with in a service context list. This list is a name-value pair list. Names are namespace qualified and define the semantics of the relationship. Values are URI's of the partner services.

When DSS services send request messages, they should expect failures due to the diverse nature of the environment in which they operate. Failures can come in the form of various faults or as a timeout. To prepare for this, DSS services should at a minimum construct request-response patterns to include continuation paths for success, fault, and timeout. In some cases, multiple types of success and/or fault are also possible. The CCR provides mechanisms to ease this task in many cases. Examples of fault-tolerant coding are provided below.

As described above, all messages between services must conform to the WSAP protocol. A service is free to define its own message types for internal interoperation. At a minimum, all DSS services must respond to the WSAP actions LOOKUP and GET. Services will respond to the LOOKUP action by returning their identity, contract identity, and service context. This information will enable a requesting service to determine whether it is compatible with this service and also provides information as to the other services that this service is engaged with (i.e., the service context). Services will respond to the GET action by returning their complete service state atomically. This will provide details of the current state of the service and will enable a supervising service to copy and possibly relocate the service.

Services may choose to enlist with the local directory service, if they wish to be discoverable by other services. Services should be designed with concurrency in mind Essentially, this means that messaging calls by the service should never be blocking. Instead, services should use asynchronous request-response messaging and leverage the CCR to coordinate message handling. Note that this recommendation does not apply to function calls for processing tasks which do not utilize communication.

Interaction between DSS services is distributed and loosely-coupled. Interactions are distributed because services will interact with each other across different machines, networks and transports. Interactions are loosely coupled because services will engage with any other service which will match their behavioral needs and will quickly change partnerships due to failures or other changing needs. In order to support this model, service interaction is fundamentally sessionless. This means that services interactions do not include a hidden context behind the exchange. Specifically, once a response has been returned from a request, no further context is presumed.

To enable distribution, the DSS service model fundamentally treats all services as potentially remote from each other. This means that identity, addresses, and types are all global and unique.

To enable composition of diverse services, DSS defines a protocol for service interaction, the Web Services Application Protocol (WSAP). WSAP consists of a small set of message types, termed "actions", which form a foundation for service interaction such as service creation, modification, and eventing.

DSS services may interact with each other using messages conformant to the WSAP protocol. All input and output messages used by a service are defined as static sub-types of this protocol. The processing of incoming messages and the generation of outgoing messages flow is described via a behavioral type system.

DSS service interaction maintains a clear separation of control and data planes. DSS recognizes that the layered end-to-end paradigm is useful for data processing, while a transparent and flat representation is more useful for message path handling. DSS uses the SOAP protocol to manage how messages are routed and processed by intermediaries (the control plane) and how message data is handled by the original sender and the ultimate receiver (the data plane).

All names in DSS are namespace qualified to ensure uniqueness. Names are globally unique Uniform Resource Identifiers (URI's). Unless otherwise stated, names may be defined as absolute or relative, though they must always be transformed to an absolute URI before being used to contact another service.

Services are the fundamental named object in DSS. A service name uniquely and globally identifies it. An example service name identifier is:

soap.rdmap://myhost.example.org/myservice/b43cad25-5f37-4c3d-bfbe-5f0ad5f8303a/

To ensure global uniqueness, an appropriate global name allocation scheme, such as DNS will be used to qualify name roots (i.e.: "microsoft.com", "example.org").

DSS services are distinguished by their behavior, which is described by a "contract". Service contracts also have unique names. An example contract name is:

http://schemas.microsoft.com/xw/2005/01/myservice.html

This name identifies a particular behavior for the service "myservice." The contract will apply to any and all implementations of "myservice" which have the behavior identified by the contract.

For convenience, this contract name may also be lexically converted to a string suitable for CLR implementation namespaces in order to type the service Microsoft.Y2005.M01.myservice. Note that this latter name is invisible outside of the implementation scope.

Wherever possible, a name should also function as an address. For example, the service name "soap.rdmap://myhost.example.org/myservice/b43cad25-5f37-4c3d-bfbe-5f0ad5f8303a/" not only uniquely names the service, but also functions as the address by which the service may be contacted. Similarly, the contract name also functions as an address, which can be used to query the contract and learn the specified behavior.

DSS services are addressed exclusively via URIs. Addresses may be based on DNS, e.g., soap.rdmap://example.com/myservice, or on an overlay network, such as pastry, for example: soap.pastry://x00000000a312b87ed7fab56053f41cb8b958f95d61daf219/myservice. Pastry is described in http://research.microsoft.com/%7Eantr/Pastry/Pastry is described in http://research.microsoft.com/%7Eantr/Pastry/.

DSS services have exactly one URI which functions both as identifier and address. One impact of this 1:1 association is that services may not be directly accessed via multiple addresses. Equivalent functionality is enabled by creating an alias relationship, which defines two services to have the exact same execution context. In this way two otherwise independent URIs like, for example, soap.rdmap://example.com/myservice and soap.tcp://example.com/myservice may be tied together by the same underlying process.

It is desirable for addresses to be as stable as possible. Services that require mobility have several options. First, a service could use addresses (and therefore identifiers) that facilitate location independence. Address overlay networks provide location independent addresses. Alternatively, a service could provide forwarding capability from the old location to the new service once it has moved. The service may also require that clients support a relocation notification message which will alert them to the service's intentions. Finally, of course, a service could move without informing its clients, if this behavior is acceptable.

The DSS communication model is message-oriented, asynchronous, and sessionless. By message-oriented, it is meant that communication between services uses strictly defined types encapsulated in discrete packets. DSS communication is almost exclusively asynchronous to promote concurrency and to better address communication uncertainty. Sessionless refers to the fact that messages are self-describing and presume no other context. Messages may imply or require a response or series of responses to a given request, but once the final response has been received, no implicit context exists within the communication channel.

DSS recognizes the importance of separate logical data and control planes for message handling. The messaging data plane supports end-to-end semantics for bulk data transfer and the control plane provides a distributed model for how the message and underlying bulk data should be processed along the path between the sender and receiver. Control plane elements may include security information, logging requests, routing information, etc., and may be identified as optional or mandatory providing the ability for intermediaries to view and/or modify an element without necessarily understanding other aspects of the message. The SOAP protocol is naturally suited to this model as the header element functions as a control plane, with optional and mandatory sub-elements while the SOAP body element serves as the data plane, with one or more payload elements.

In cases where the data transfer is quite large, DSS uses SOAP messages as a control plane and suggests using accelerated RDMAP for the data plane. In this case, the SOAP messages function as a scatter/gather list referring to content on the data plane, typically using an octet-oriented transport.

This permits the use of different transports for control versus data plane, which may be appropriate for streaming data scenarios.

DSS services entrust message handling to various forwarding agents. A service may request various message handling models (e.g., in order, encryption, max latency). Based on the service request and the administrative context that the service operates within, a set of intermediaries may be enlisted for managing the messaging path.

DSS messages are immutable to ensure that two services do not simultaneously access data. All messages sent between services may be copied as a function of serialization. This applies even to services within the same node. Messages sent within a service (i.e., from a service to itself) should be explicitly cloned to avoid simultaneous access.

All messages may be sent by services to ports via a POST method. POST is asynchronous and will immediately return control to the calling function. Services may send any message type to themselves or they may send WSAP messages to other services. A service may enlist the core Forwarder services to provide a communication path to other services. Forwarder services are described in detail below.

Services may use CCR primitives to "activate" a continuation handler for received messages. To do this, the service associates a port and a message type with a continuation handler which accepts the type. Services receive messages from other services via their main port. Services receive messages from themselves either via their main port or via private ports they have established. Complex message handling constructs are easily supported via the CCR.

The DSS encourages asynchronous communications such that message sending and message reception are disjoint. This forces the designer in a distributed system to explicitly account for communication between processes. Distributed systems are more prone to issues of communications latency, failure and concurrent state access. Whereas synchronous communications (request blocks for the reply) implicitly ignores these issues, by separating message posting from message reception, the DSS program must make specific decisions regarding how to handle the complexities of distributed processing. The result is that delays and failures can be better accounted for.

DSS service interactions are intended to be sessionless. This means that once a request-response exchange has completed, no further communication context exists. This has advantages in a distributed environment by promoting "loosely coupled" interactions between services. In this paradigm, services must accept failure and delay as a common occurrence. Process interactions can of course be much more complex than will fit into a simple request-response pattern. DSS resolves this by recommending that a long-running "session" is managed by its own distinct service that holds the session state and thereby manages the connection explicitly. In this way, the complexity of the communication may be encapsulated in a standard and observable way.

DSS services interact via messages. All messages are composed of strongly-typed and serializable objects defined as XML infosets and described by XML schema. Some WSAP message bodies, such as GET request are defined as fixed by the WSAP XML schema. Other message types, such as INSERT request are define by service-specific XML schemas and associated with specific WSAP actions. For example, a reservation queue service may define a ReservationRecord type that can be sent as the body of either an Insert or Delete message. All DSS services conform to the WSAP XML schema.

In a diverse and distributed environment, a standardized interface for process interactions is a powerful tool. Lack of a standard interface would mean that all interactions would be highly customized to each service (or even to each relationship—an N-squared task). This is a strong obstacle to service reuse. Conversely, a common interaction semantic that is simple, complete, and rarely modified enables much faster design, deployment, and reuse. In this case, each service must conform to the protocol, but will thereby gain access to a range of other services.

A set of standard interface semantics must be sufficiently comprehensive and flexible as to allow any anticipated service interaction, while also being appropriately rigorous as to permit easy inference of behavior. This inference of behavior capacity is key to rapid development and deployment of new capabilities and compositions for at least the following reasons. First, intermediaries between two services may infer behavior and add value to the interaction without understanding all details of the functionality. Caching services fall into this category. Second, supervisory services may interact with other services without having a-priori knowledge of the service. For example, a supervisor may perform relocation or replication tasks. Third, services can be more rapidly designed or modified to interoperate with other services if there is a common set of interaction methods. DSS defines WSAP to serve these purposes.

The DSS presumes IP is used for the network layer. No assumptions are made regarding what data link/physical layers lie underneath. The transport layer in DSS is flexible. For DSS message delivery, many implementations may utilize TCP, but UDP and RDMAP are acceptable transport mechanisms. DSS encourages the use of the hardware-assisted RDMAP standard for high-speed delivery of payload over TCP/IP. DSS also recognizes that data transfer can occur beyond the bound of messages. This data flow is managed by messages but is not contained within messages. RTP and RDMAP are suitable transports for this content.

The SOAP protocol may be used for delivery of all DSS messages. SOAP is designed for passing strongly typed and structured data between peers in a distributed environment. SOAP provides a clear structure for fault handling, intermediary processing of messages and message extensibility.

A SOAP payload is called a message. Messages are sent by an "originating sender" to an "ultimate receiver" through any number of "intermediaries." Intermediaries may perform ancillary tasks, such as routing, logging, security, etc. SOAP messages are grouped into message exchange patterns ("MEPs") between the originating sender and the ultimate receiver. Valid message exchange patterns include request, request-response, and request—(n)intermediate responses—final response.

It is important to remember that the SOAP routing path operates at a higher level of abstraction than network and transport layers. Therefore, SOAP intermediaries and endpoints may be connected via a number of lower-level routing and bridging entities.

Figure 4:
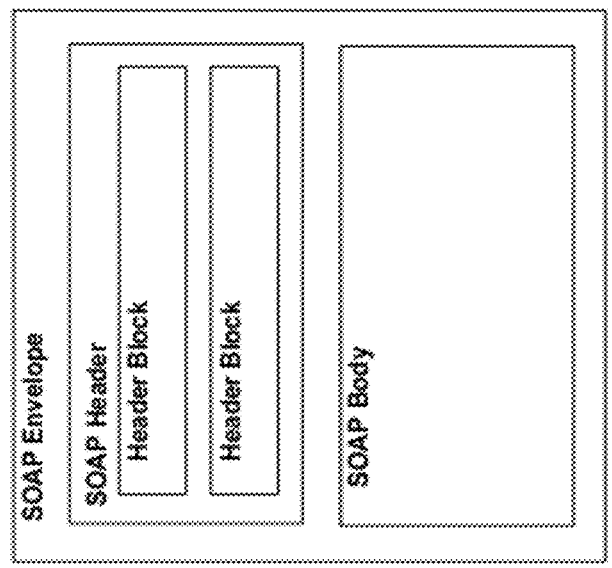
FIG. 4 depicts an example SOAP message.

FIG. 4 depicts an example SOAP message. As shown, a SOAP message may include a single "envelope" element which contains one "header" element and one "body" element. One aspect of SOAP which is especially appealing is the explicit separation of the messaging control and data planes through the use of the header and body elements within the SOAP envelope.

The SOAP body element serves as an end-to-end delivery vehicle for the message payload, with the intent that most intermediary nodes (forwarders and certain processors) are unlikely to modify or even access its contents. Payload in the SOAP body may be wrapped with additional levels of processing, such as encryption. This element thus serves as the routing-independent "data plane" for communication.

The SOAP header element contains a list of SOAP header blocks which indicate control-plane functionality for how the message is managed. This may include adjunct functionality such as routing, logging and debugging. It may also indicate security mechanisms employed on the body of the message. The fact that header blocks are non-nested enables orthogonal control-plane processing. SOAP headers may be qualified as mandatory ("mustunderstand") or optional. Optional headers are further qualified as to whether intermediaries should forward them ("relay"). These specifications may be directed to intermediaries and/or to the ultimate receiver. This control plane architecture allows flexible and extensible message management by a range of intermediaries without requiring complete understanding or access of the data payload.

The DSS defines WSAP for use in service interactions, based upon SOAP. WSAP is disclosed and claimed in U.S. patent application Ser. No. 10/856,399, which defines a number of basic verbs relating to how state changes are observed and propagate. A goal of WSAP is to standardize all interactions between services to a small set of actions that use sessionless communications to manipulate service state. WSAP messages are typically of the form "Request, Response", though the response message is not used in all cases. Additionally, a succession of intermediate responses may be supported before the final response.

The message patterns are termed "sessionless" in that the request message does not imply any context beyond the request-response message exchange. Once the final response to a request has been sent, the targeted service can essentially forget the exchange took place. When a more elaborate session context is required, DSS recommends that the session information is captured as state in a dedicated service. This model encourages loose-coupling between services and promotes observability of processes and state.

The genesis of WSAP was the observation that the HTTP protocol was extremely successful in part due to the very simple and limited set of methods supported (e.g., Get/Head, Post, Put, Delete). WSAP carefully expands on the capability of the HTTP methods to define methods which permit additional behavior while still enjoying the benefits that a constrained set of methods provide in terms of promoting rapid design of compatible services despite diverse implementations.

The shared semantics of WSAP eases composition and layering of services by defining a simple, but complete protocol for interaction. WSAP defines a restricted set of actions to enable quick inference of behavior. The state-oriented nature of the WSAP protocol provides many useful properties. Atomic access of service state will enable persistence, checkpointing, and relocation of the service. Services may easily support replication by duplicating their state and forwarding messages on to another instance of themselves. Caching intermediaries can be easily created by establishing a lease with the target service and intercepting traffic. These features of WSAP encourage scalability, mobility, and load balancing.

WSAP actions are strictly characterized in terms of their safety and idempotency. Safe actions are guaranteed to not modify the state of the service ("read only"). Idempotent actions are independent of the number of times they are executed against the service (for one or more invocations).

WSAP actions support service management for functionality such as service classification, startup, and termination; service state access for performing querying and state modification actions; eventing, as supported by a subscription and notification model; and service replication. In the DSS architecture, services are described as behavior conjoined with state, therefore, the WSAP actions reflect this by targeting service behavior and state.

The WSAP actions are lookup, create, drop, get, query, replace, insert, delete update upsert, subscribe, notify, and replicate. Lookup is the only required method for services. A service will respond to a Lookup method by returning the URI of its behavioral contract as well as the list of currently engaged "partners" that it is engaged with. Create may be used to create a new service. Drop may be used to terminate a service. The mechanism and timing of the termination (or even if the Drop will be acted upon) are service dependent. Get atomically returns a copy of the entire service state at a particular time. Query returns elements of a service state. Query messages can contain directives to indicate which aspect of the service state is being queried. Replace atomically changes the entire service state. Insert adds an element to the service state. Delete removes an item from the service state. Update modifies an item of the service state. Upsert atomically modifies an item of the service state, or inserts such an item if it did not previously exist. Subscribe requests event notifications as defined by message type. Notify provides an event notification message from a subscribed service to a subscriber. Replicate requests that a service create and maintain a replicant of itself WSAP messages are transported in SOAP envelopes. The SOAP body block includes the message body (or a fault body in case of failure). The SOAP header block includes a list of control-plane operations relating to the processing of the message. One header block will indicate the WSAP action of the message. This will enable intermediaries to infer some behavior without needing to access the service endpoint contracts. For example, since Query and Get are safe actions, an intermediary could function as a cache and replay responses to duplicate requests of these types. Note that refreshing issues will still apply. Services can manage the issue of data freshness by maintaining a renewal period item in their state. Caching services can then enlist the core Sequencer service to perform occasional data refresh.

When a service is constructed, a dedicated set of associated services that serve to connect the service with other services are created in the same node. These "forwarding" services provide message processing tasks such as (de)serialization, security, logging, debugging, transport, and any other system or service specific message handling processes. These forwarding services manage both inbound and output messages to and from the service.

When a service is created, it indicates one of its ports which will be its "main port." This port is associated with a URI and will function as the single public address for the service. Messages received by the node which list this URI as a destination will be routed to the service, through its forwarder path and to its main port. The forwarder chain will deconstruct incoming messages (which may involve deserialization, security, logging, and debugging processes) and deliver it to the target service's main port.

Services establish connections to other services by submitting the destination URI to a local (well-known) forwarder creation service. This service will create a new "request forwarder" and an associated private communications port which the requesting service may use to send messages to the specified destination service. By default, this request forwarder will be linked in to the rest of the forwarder chain such that output and inbound processing is symmetric, though services are free to set up custom forwarding chains for specific connections. The forwarding services are described in more detail below.

Asynchronous communication means that much of a service design is event driven. Services are configured to handle requests as incoming events and clients of those services will configure continuations for handling of responses. For cases where a client service wishes to receive event-based notification messages from a target service, it will employ the DSS eventing model. Where a service wishes to be informed of events which occur in another service, it may SUBSCRIBE to that service, using a message which conforms to the WSAP Subscribe action. Services may either list their URI or another service's URI as the destination address for notifications. Once a subscription is in place, notifications will be forwarded to the destination service as WSAP Notify actions.

Events in DSS are modeled as the result of state changes within services. For example, an UPDATE request changing the state of a service will result in an UPDATE notification being sent to subscribers of that service. Services may choose to enable filters in their subscriptions so that subscribers only see a subset of the service state changes.

Service interactions may encounter a range of failures. Failures may caused by sending, receiving or message-path intermediary services. Likewise, failures may be detected by any of these entities. Examples include a sending service creating a message that is of the wrong type or is sent at the wrong time (based on the contract of the receiving service). This is an example where the failure is caused by the sender, but detected by the receiver. Next, an intermediary may reject a message because it does not understand a required header entry. Intermediaries may also fault a message due to processing requirements that cannot be met. Security policy is a simple example of this case. Finally, the message request or response may be lost or delayed at any point in the path, including failure of the receiver to respond in a certain time. This class of failure appears as a timeout, either at the sender, or at some intermediary. The SOAP protocol supports basic fault classifications which may be extended for service-specific failures.

The asynchronous communication model employed by DSS services means that the handling of a response to a request must be explicitly specified by the programmer An advantage of this requirement is that it is very easy to specify fault processing control flow at the same time as the success branch is specified. Whenever a DSS service expects a response from a request message it posts, it should define continuation handlers for success, fault, and timeout. In some cases, multiple success and/or fault types may be appropriate. The CCR supports this through various primitives.

EXAMPLE

Explicit Success, Fault, Timeout Handling

```
//the request port
Port<rqstMsg> pRqst = new Port<rqstMsg>{ };
//the response port
//DSS ports automatically support fault and timeout types
Port<successMsg, W3C.Soap.Fault> pRsp
    = new Port<successMsg, W3C.Soap.Fault >( );
//send the message
pRqst.post(new rqstMsg("help", pRsp);
//prepare for various responses
activate(
    pRsp.with(mySuccessHandler)
```

-continued

```
    |
    pRsp.with(myFaultHandler)
    |
    timeoutport(DefaultTimeout).with(myTimeoutHandler)
);
void myResponseHandler(successMsg theRsp)
{
    Debug.WriteLine("got this response: " + theRsp);
}
void myFaultHandler(W3C.Soap.Fault theFault)
{
    Debug.WriteLine("got a fault: " + theFault);
}
void myTimeoutHandler(Timeout theTimeout)
{
    Debug.WriteLine("request timed out");
}
```

A DSS application is a collection of services that are composed or layered to perform a set of tasks together. These services will share a specific set of goals to collectively perform the objectives of the application. The services will share common requirements such as performance and reliability needs, as well as common contexts such as security and management. This common context is exposed in each service as the list of partners that it is engaged with.

Programmers are at liberty to define and construct custom services for their application; however, the simple and standardized interface of the DSS infrastructure encourages high reuse of services for diverse applications so that programmers ideally construct applications mostly by defining how existing services will be connected together.

Since a DSS service provides specific but limited functionality and uses a simple interaction protocol, it is reusable to a broad class of applications. Service reuse may be logical, where multiple applications use distinct instances and perhaps distinct implementations of a common service type. A queuing service is an example where multiple applications may use the same service type, but create unique instances of it. Alternatively, reuse may take place directly at runtime, where multiple applications enlist the same service instance. The Directory service is an obvious case where multiple applications will use the same service instance.

DSS provides a set of conventions for constructing applications by composing and layering services. This is called Distributed Protocol Oriented Programming (DPOP). DPOP conventions specify how to structure applications in a decentralized, heterogeneous environment in such a manner that they can deal with scalability, partial failure, and cross-trust boundaries.

DSS applications are simply a collection of services working together toward a common set of goals. To reach these goals, services must discover other services that they can compose with to perform specific tasks. Services may be aware of the other service types that they seek to interact with, in which case the task of discovery is one of finding a service which matches that type within an appropriate context. Alternatively, an application may search a particular context to determine which services are running within it.

Within a node, a well-known local Directory service will provide discovery services. Access to the directory service is provided via a port that a service is given upon creation as part of its environment. Services which wish to be found by other services will register with their local Directory service by inserting a record with their identifying information into the Directory. Services may use their local Directory service to locate other services of a particular type within their node.

Services may also query the Directory in order to learn which other services are currently running within the node.

If a service is seeking to find a service in another node, it may query the Directory service in that node. By performing a LOOKUP on another service, an initiating service can learn which Directory service the target is partnered with. This provides the node context of the target service. The initiating service may then query that Directory to find other services in that same node.

For broader discovery operations, the core NodeDirectory service is used. This service functions as a member of an overlay network (independent of IP address and physical location). The NodeDirectory employs the Pastry protocol to form a logical network with other NodeDirectories. Pastry enables robust and efficient location-independent addressing within a 160-bit address space. Services which wish to be addressed in a location-independent manner may connect their main port to a pastry URI of the form: soap.fednet://X4RdCbLQ3-4Bb__2QzKwb/MyService/57fbb72f-a57b-4a2b-8a60-61f3ce81bcca.

DSS services can announce themselves to their local NodeDirectory. From that point, other services which are seeking a particular service name or type can quickly locate the announced service without knowing which node it is hosted by.

Services within an application necessarily leverage many other services to perform tasks. Ensuring compatibility between services is fundamental to the application achieving its goals.

Services may have a priori (e.g., design-time) information regarding which other services they are compatible with. This information could essentially be a list of global and unique contract names that the service is compatible with. In this case, the initiating service could search among Directory services of the desired context to discover a service with a matching contract. If none is found, the initiating service may request that a Constructor build an instance of the service desired. Alternatively, a service may encounters another service and perform a WSAP LOOKUP against that service to determine if there is compatibility between them. If the contract name of the potential partner matches a known contract, it can be determined that the services are compatible. This relies on a compatibility validation which was performed at design time, combined with global and unique name matching of the service contract name.

In many instances, a service may not have a priori information regarding the behavior of another service. The target service may have extended or restricted behavior beyond a contract that the initiating service was aware of at design time. It may have incorporated multiple behaviors into a single behavioral construct. It may have an altogether new behavior. In all of these cases, a lexical match on the contract name will fail (indicating that the behavior is unknown to the initiating service). However, it is possible that the services are still technically compatible and can perform a successful composition.

To enable these cases, a service contract must be employed not just as a name, but as a behavioral type. DSS contracts function not only as a name, but as an address. In fact, DSS contracts are services in their own right and may be queried to learn their state, that is, the behavior rules of any service which conforms to the contract. For example, by performing a LOOKUP action on a service, the contract name will be returned. This name is also the address of the contract service. A GET action may then be sent to this address. The response to this GET will list the behavior rules of the contract.

A service may evaluate the composition of two (or more) contracts to determine compatibility. The DSS will include a contract compatibility service to serve this purpose. Services may submit their contract and the URI of another contract to determine compatibility between themselves and another service.

DSS applications are collections of many services which interact in a compositional or layered structure. DSS services are small and provide limited functionality individually. It is the interaction of services which creates a larger execution context.

The composition model means that when a service enlists another for value-added services, the targeted service may perform extra functions or delegate some tasks beyond the knowledge of the originating service. This is acceptable as long as the ultimate result conforms to the contract agreed upon.

While a distributed system-architecture should be functionally agnostic to the locality of clients and services, the distance between two interacting services necessarily impacts performance and complexity of design. Metrics for distance may include, for example, spatial distance, communication latency, addressing/namespace locality, and relational distance (degrees of separation). The "context" of a service is defined to be a function of what other services are within small distances of it.

DSS recognizes that applications may have very differing needs and therefore different priorities for selecting a context of services. Since all functionality in DSS is encapsulated in a service, the fundamental context of a DSS service is what other services it is engaged with. DSS services are required to provide a list of their relevant relationships in response to a WSAP LOOKUP action. This serves as a starting point for determining other contextual information.

For example, a service may be associated with a particular directory service, construction service, forwarding service, security administrator, timekeeper service, and GPS service. The Timekeeper service may function as a specific timing server while the GPS partner service may provide the service with current coordinate information. In as much as these associates are relevant to the behavior of the service, they should be explicitly included when a WSAP LOOKUP message is sent to the service. Thus, inquiries to the service can appropriately discern context in which the service operates. Inquiring services may use this relationship information to then determine other contextual information such as location and time domain.

Distributed systems must address state sharing. The DSS architecture will support many styles of state sharing, with recommendations for which styles are most effective in particular circumstances. Three methods of state sharing are now described.

Figure 5:
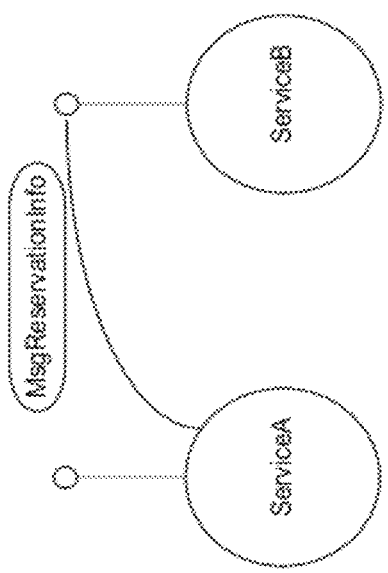
FIG. 5 depicts encapsulation and transference of a single state object between processes.

According to a first such method, depicted in FIG. 5, a state may be stored in an immutable message and transferred between services. Such a method may be referred to as "encapsulation and transference of single state object between processes." The http GET and POST methods are examples of this style. This method is very simple and robust, but may be expensive for large state objects. Where large data objects must be transferred between domains (e.g., file exchange or streaming), DSS recommends that services use the rdmap protocol for fast data delivery.

Figure 6:
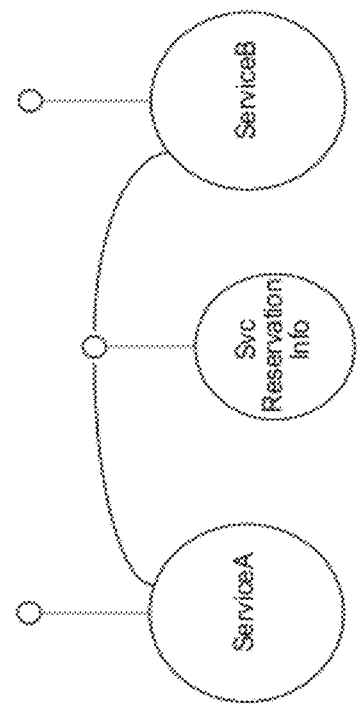
FIG. 6 depicts serial access to a single state object.

According to a second method of state sharing, depicted in FIG. 6, a group of client services may share state objects by creating a unique service to manage the state object. Such a method may be referred to as "serial access to single state object," and is often termed a "session." The client services can then reference the state via its unique URI. The mutual exclusion access of the state object can be implemented in the new session service by controlling read/write access. The CCR includes primitives which enable reader-writer exclusions to permit efficient access by multiple client services.

Figure 7:
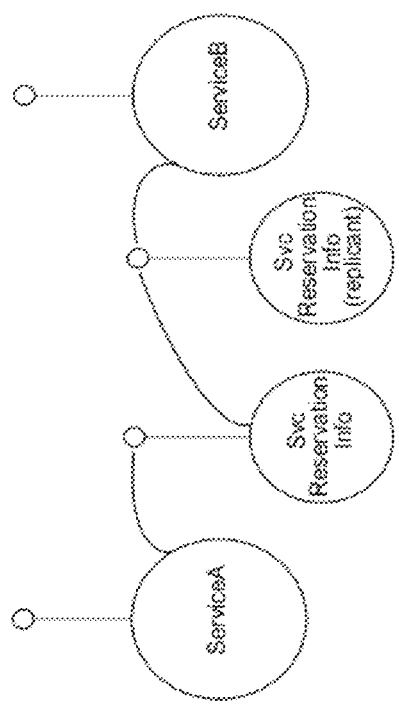
FIG. 7 depicts replication and synchronization of a state object.

A third method for state sharing, depicted in FIG. 7, may be referred to as "replication and synchronization of state." Replication of a state object enables reliability and/or performance improvements. When session state is encapsulated as a service the service can be designed to support the REPLICATE WSAP action. In this case, multiple copies of the service will exist and can be accessed by a group of clients.

The DPOP model implements all state entities as part of a service. DPOP recommends that invariants for the state are localized within the service. Other services would then access the state by referencing the hosting service and specify which actions to perform on the state. This model attempts to reduce distributed transactions as much as possible. As a simple example, a counter state object would be implemented in a service which could support UPDATE_INCREMENT, UPDATE_DECREMENT, and UPDATE_INTEGER actions. These would ensure that the counter behaves appropriately when accessed by multiple clients simultaneously.

Event synchronization is a challenging problem in distributed systems. Where possible, designs should avoid event timing dependencies between services by using sessionless request-response patterns. Where event tracking is required, DSS provides two models. First, DSS supports causality tracking of message flow via the forwarding and scheduling core services. Next, DSS provides a set of time services for creating common time scopes between sets of services. These services may be employed to create synchronization mechanisms for linearizing events.

DSS recommends managing shared objects and structures as immutable data in order to avoid many of the consistency problems with shared objects. To optimize performance for immutable objects, small structures are cloned using precompiled code which leverages the strong typing of DSS.

For larger data structures, a deconstruction and versioning solution is endorsed. For example, a large file can be broken up into many smaller pieces (chunks) and associated with an indexing chunk that references the file sub-chunks. Read operations would access the index and get the most recent view of the file. At the same time, a write operation can make changes by cloning and then modifying a subset of chunks. Once the update is complete, the index can be atomically updated, or cloned if the old version still has value. Thus, readers will always have a clean atomic view of the file. Performance cost is constrained by appropriate choice of chunk size. In cases where simultaneous multiple writes to a structure is desired, service-specific consistency methods must be employed.

Unique naming is an asset in maintaining consistency in fault-prone systems. For example, by uniquely naming all objects which are stored in a queue, duplicate enqueue and dequeue operations can be detected. This is important as communications failures may cause retries. It is helpful if excessive retries do not negatively impact the system.

DSS makes no explicit consistency claims regarding the view that multiple clients will have of data structures. In particular, messages may be arbitrarily reordered, leading to false assumptions regarding the current state. The de facto consistency model of DSS is best described as "eventual consistency" which states that clients will eventually see the current state of a data object, though when, and how this relates to other clients is unknown.

If message order is critical to a service, then it must use some causality tracking mechanism to ensure the consistency model it desires. Custom forwarder services may be employed to provide this function. If monotonic reads and/or monotonic writes consistency is desired, a standard message sequence number mechanism can be used. For more complex causality tracking, TimeScopes, with embedded timestamps in messages, may provide a good basis for linearization of messages.

Replication of processes and/or state is useful either for performance or for robustness/reliability improvements. The challenge with replication schemes is maintaining synchronization between replicants. The WSAP protocol includes an explicit "Replicate" action. Services which support this will duplicate themselves to a replicant service and then forward all future requests on to the replicant service. This mechanism provides a means for reliably preserving state. Where a performance improvement is desired, the consistency of the replicants may be less critical. For this case, the service may be cloned, but will not maintain synchronization.

DSS services operate concurrently with each other. In fact, for any service which includes multiple continuation handlers, the service should be considered to be concurrent with itself. It is vital that services maintain state invariants to avoid inconsistencies and state contamination. The CCR coordination primitives provide a good platform to help programmers in this responsibility.

Applications may discover running services which they can use to perform their tasks, using discovery techniques discussed above. Alternatively, an application may choose to create unique instances of a service to perform particular functions. Construction of a new service instance is performed by first determining in which node the service should be constructed. Next, the core TypeDirectory service in that node must be made aware of the service type which is to be constructed. Finally, the core Constructor service is requested to build the service instance. The Constructor will activate the service of the specified type, build a chain of forwarding services to connect the service to transport and return the URI of the service to the calling service. A default constructor exists, though custom constructors may be defined for specific needs, such as creating special-purpose forwarding chains. The core ManifestLoader service provides this functionality as a batch-mode operation.

DSS services may be relocated and restarted by capturing their behavior (WSAP LOOKUP action) and their state (WSAP GET action). A new instance of the service may be activated (using the core Constructor service) and the state data is then restored (WSAP REPLACE action). Service context may also be replaced if needed. In some cases, it may be desired that services leave forwarding tombstones to the new service instance.

Distributed garbage collection of unreferenced services is handled via leasing. That is, services should require clients to establish a subscription, with a specified Lease period. If the client does not renew the Lease in time, the subscription will be dropped. Once a service has no more subscribers, it will self-terminate.

The WSAP protocol enables caching services to be quickly added to an application. As GET and QUERY actions are required to be safe operations on a service, an intermediary may detect multiple identical operations and respond on behalf of the target service. Data freshness can be ensured by updating the cache in a timeframe specified by the target service.

DSS Core Services

The following "fundamental" core services may be utilized within a node to build functional DSS services. A "Scheduler" service may be provided to process scheduling within a service. Services are free to create schedule contexts with as many simultaneous threads of execution that they desire. A "Constructor" activates new services in the node. It builds a chain of forwarding services to connect the service to other intra-node and inter-node services. The node will include a default constructor, but other constructors may be derived for special purposes (e.g., defining alternate forwarder chains). A "Directory" holds a list of local services. Derivative directory services may also be created for special purposes (e.g., orchestration of a group of services particular to an application). A "NodeDirectory" enables global discovery by enlisting in the Pastry overlay network. A "TypeDirectory" maintains a list of known service types available for activation within the node. A "Serializer" transforms message objects into XML and vice-versa.

Figure 8:
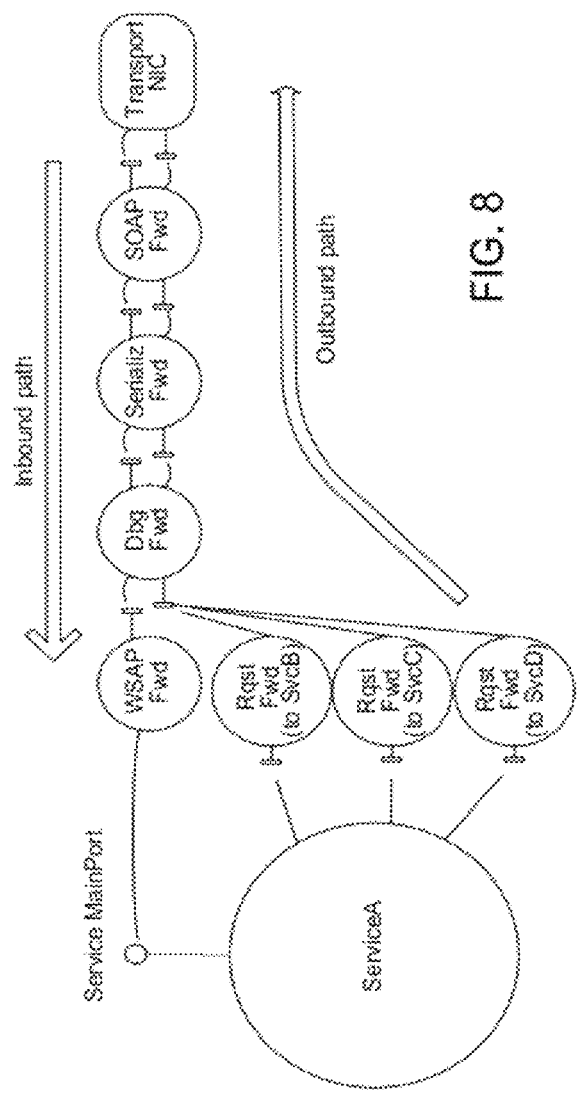
FIG. 8 depicts forwarder services that enable inter-communication between DSS services.

As shown in FIG. 8, core "Forwarder" services (Fwd) enable all inter-communication between DSS services. Forwarders provide message handling functionality such as security, logging, debugging and transport. Every service is constructed with its own set of forwarding services which link together to create a path for message processing. In most cases, the default message path configuration is desired, as determined by administrative services. If a custom set of forwarding services is required, this may be specified at service construction, or a service may dynamically create any number of forwarding chains for special-purpose connections.

Forwarding services may operate on either the control plane (such as logging or routing) or data plane (such as security) of the message. In any case, the message header will indicate which processing steps it has been through. This clear separation and transparency of control and data enables easy inspectability and extensibility of message processing. Message processing steps are added to the SOAP message header so that intermediate nodes as well as the destination service can ascertain how the message was managed.

Messages inbound for a service are processed by the forwarding path and eventually delivered to the services main port. For message delivery to another service, a unique "Request Forwarder" service is created and linked into the forwarding chain. The sending service is given a private port which connects to the request forwarder and can be used to send messages to the destination service. The request forwarder will maintain state for outbound requests such that inbound responses can be associated with an original request. These responses will be routed via the inbound path to a port associated with the original message. This allows the requesting service to simply and explicitly specify how the response should be handled.

Forwarder services are coordinated within a node at the transport layer with a unified URI map table. This table associates URI entries with forwarder chain ports and is thus used to resolve incoming messages and direct them to the appropriate service.

Figure 9:
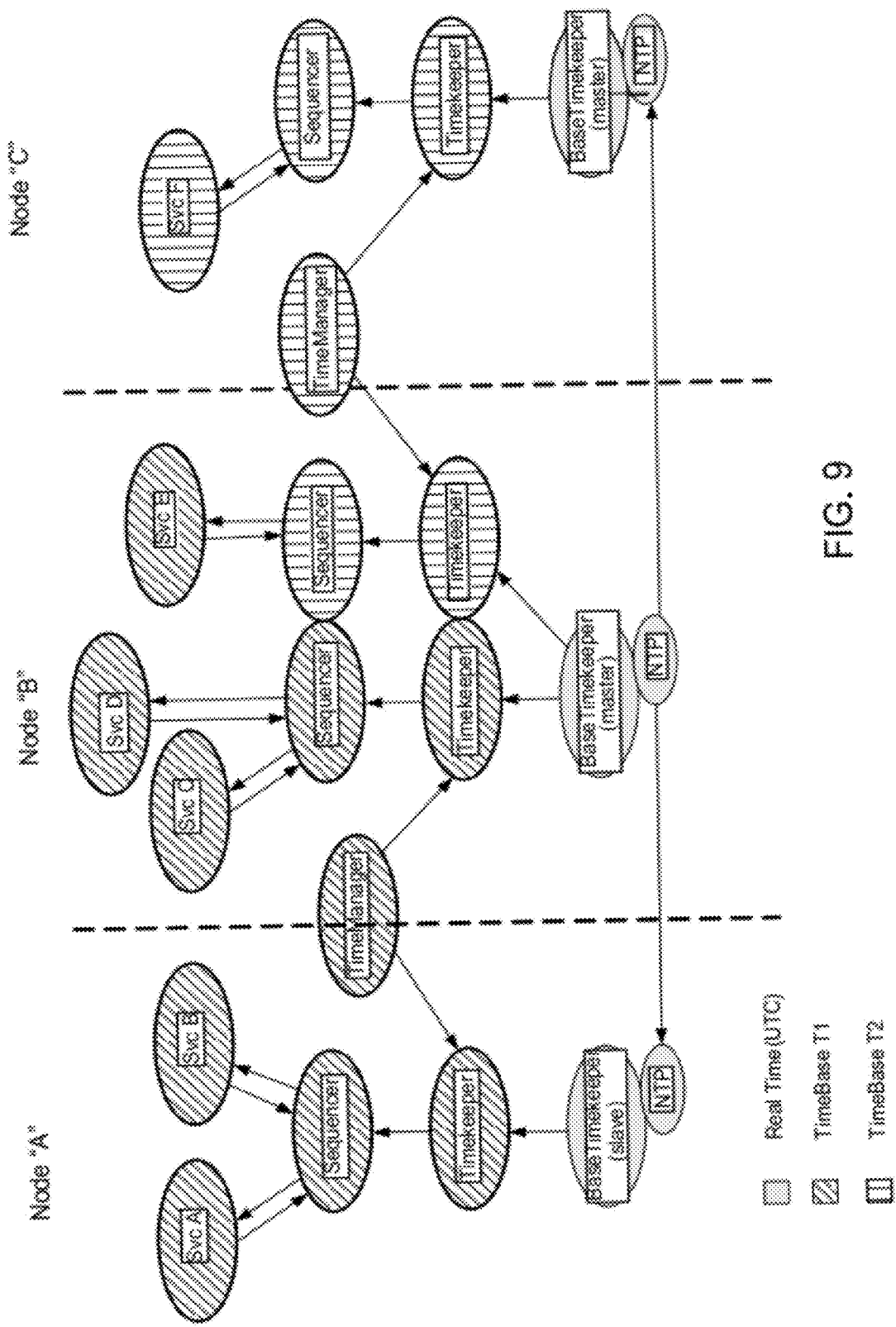
FIG. 9 depicts an example of distributed time services.

As depicted in FIG. 9, Distributed Time Services, such as BaseTimekeeper, Timekeeper, TimeManager, Sequencer, and FedSequencer sercvies, may also be provided. The Distributed Time Services are constructed as a tiered timing structure. At the lowest level, NTP is used to provide a consistent concept of current time. Above this, Timekeeper services will provide contextual timing services. A timing context is called a TimeScope. A TimeScope is a monotonic, piece-wise-linear representation of time. A TimeScope can increase faster or slower than "real time". It can also be paused and restarted. Any number of Timekeepers may be members of the same TimeScope. Examples of TimeScopes are media session streams and debugging contexts.

TimeManager services function as a coordinator for a given TimeScope. That is, requests for modifications to the TimeScope are directed to the associated TimeManager. This will then forward the change to all subscribed Timekeepers.

The following "common" core services are commonly used by DSS services and so are provided by DSS for convenience. A "Subscription Manager" provides common subscription maintenance functionality to services. A "ManifestLoader" loads a specified set of services using TypeDirectory and Constructor services. "Lease Services" provides common leasing semantics for services to manage time-limited functions. A "CompatibilityValidator" compares service contracts to ensure compatible execution. A "Log" service provides logging functionality. A "Trace" service provides tracing functionality. A "Debug" service provides mechanisms for tracking message flow, execution context, and fault history.

Example Creation and Deployment of a DSS Service

The following is an example of how to create and deploy a DSS service. The example demonstrates a service that will respond to a WSAP GET message by returning a "Hello World" message to the requestor. This service also supports the required LOOKUP action and the termination DROP message.

First, a service interaction schema is created in XSD. An example of such a service interaction schema is:

```
<?xml version="1.0" encoding="utf-8" ?>
<xs: schema
    targetNamespace="http://schemas.microsoft.com/xw/2005/02/simpleservice.html"
    xmlns:tns="http://schemas.microsoft.com/xw/2005/02/simpleservice.html"
    xmlns:wsap="http://schemas.microsoft.com/xw/2004/10/wsap.html"
    xmlns:wsapop="http://schemas.microsoft.com/xw/2004/10/wsapoperations.html"
    xmlns:soap="http://www.w3.org/2003/05/soap-envelope"
    xmlns:xs="http://www.w3.org/2001/XMLSchema"
    elementFormDefault="qualified"
    attributeFormDefault="unqualified"
    blockDefault="#all">
    <xs:import
        namespace="http://schemas.microsoft.com/xw/2004/10/wsap.html"
        schemaLocation="http://schemas.microsoft.com/xw/2004/10/wsap.html" />
    <xs:import
        namespace="http://schemas.microsoft.com/xw/2004/10/wsapoperations.html"
        schemaLocation="http://schemas.microsoft.com/xw/2004/10/wsapoperations.html"
    />
    <xs:import
        namespace="http://www.w3.org/2003/05/soap-envelope"
        schemaLocation="http://www.w3.org/2003/05/soap-envelope" />
```

-continued

```xml
<!-- Service Enumerations -->
<xs:simpleType name="PartnerEnumType">
    <xs:restriction base="xs:QName">
        <!--<xs:enumeration value="tns:Binding"/>-->
    </xs:restriction>
</xs:simpleType>
<xs:simpleType name="FaultEnumType">
    <xs:restriction base="xs:QName">
        <xs:enumeration value="tns:StateCloneFailure"/>
    </xs:restriction>
</xs:simpleType>
<!-- Service Type Definitions -->
<xs:complexType name="StateType">
    <xs:sequence>
        <xs:element name="Value" type="xs:string" />
    </xs:sequence>
</xs:complexType>
<xs:element name="State" type="tns:StateType" substitutionGroup="wsap:GetResponse"/>
<!-- Request/Response Element Definitions -->
<xs:element name="GetResponse" type="tns:StateType" substitutionGroup="wsap:GetResponse"/>
<!-- Service Operation Definitions -->
<xs:complexType name="GetOperationType">
    <xs:sequence>
        <xs:element ref="wsap:GetRequest"/>
        <xs:choice>
            <xs:element ref="tns:GetResponse"/>
            <xs:element ref="soap:Fault"/>
        </xs:choice>
    </xs:sequence>
</xs:complexType>
<!-- Main Service Port Definition -->
<xs:complexType name="SimpleServiceOperationsType">
    <xs:all>
        <xs:element ref="wsapop:Lookup"/>
        <xs:element ref="wsapop:Drop"/>
        <xs:element name="Get" type="tns:GetOperationType"/>
    </xs:all>
</xs:complexType>
<xs:element name="SimpleServiceOperations" type="tns:SimpleServiceOperationsType" substitutionGroup="wsap:ServiceOperations"/>
</xs:schema>
```

Then, a service implementation may be created in C# using CCR primitives:

```csharp
using System;
using System.Collections.Generic;
using System.Diagnostics;
using Microsoft.Bigtop.Services.Serializer;
using Microsoft.Bigtop.Services.Forwarders.WSAP;
using Microsoft.Bigtop.Core.Messaging.WSAP;
using Microsoft.Bigtop.Core;
using Microsoft.Bigtop.Core.Attributes;
using Microsoft.Bigtop.Core.Messaging;
using Microsoft.Bigtop.Core.ResourceManagement;
using Microsoft.Bigtop.Core.Signals;
using Microsoft.Bigtop.Core.Utilities;
using wsap = Microsoft.Bigtop.Xw.Y2004.M10.wsap;
using ds = Microsoft.Bigtop.Xw.Y2004.M10.directory;
namespace Microsoft.Bigtop.Xw.Y2005.M02.simpleservice
{
    [Contract(Contract.Namespace)]
    public class SimpleService : WSAPServiceBase
    {
        class StatePort : Port<StateType>
        {
        }
        [AlternateBindings(Contracts.HttpTransport)]
        [ServicePort("/simpleservice")]
        SimpleServiceOperations _pMain = new SimpleServiceOperations( );
        StatePort _pState = new StatePort( );
        public SimpleService(WsapServiceCreationPort pCreate) : base(pCreate)
        {
```

```
                        CreateSuccess( );
                }
                protected override void Start( )
                {
                        StateType State = new StateType( );
                        State.Value = "Hello World";
                        _pState.post(State);
                        activate(
                            !_pMain.with(DefaultLookupHandler)
                            |
                            !join<Get, StateType>(_pMain, _pState).with(GetHandler)
                            |
                            _pMain.with(DropHandler)
                        );
                        Directory Insert( );
                }
                void GetHandler(Get get, StateType state)
                {
                        //try-catch-finally block is used to ensure state is always posted back to state port
                        try
                        {
                            get.pResponse.post((StateType)state.Clone( ));
                        }
                        catch
                        {
                            get.pResponse.post(new msgWsapReceiverFault( ).SoapFault);
                        }
                        finally
                        {
                            _pState.post(state);
                        }
                }
                void DropHandler(wsap.Drop drop)
            {
                drop.pResponse.post(new wsap.DefaultDropResponseType( ));
                DirectoryDelete( );
                Shutdown( );
            }
        }
    }
```

A manifest may then be created to specify loading the service:

```
<?xml version="1.0" ?>
<m:Manifest
    xmlns:m="http://schemas.microsoft.com/xw/2004/10/manifest.html"
    xmlns:wsap="http://schemas.microsoft.com/xw/2004/10/wsap.html"
    xmlns:simpleservice="http://schemas.microsoft.com/xw/2005/02/simpleservice.html">
    <m:LoadServiceList />
    <m:CreateServiceList>
        <m:ServiceRecord>
<wsap:Contract>http://schemas.microsoft.com/xw/2005/02/simpleservice.html
</wsap:Contract>
    <wsap:ServiceName
prefix="false">soap.rdmap://localhost/simpleservice</wsap:ServiceName>
        </m:ServiceRecord>
    </m:CreateServiceList>
</m:Manifest>
```

Finally, a DSS node is created. The node is asked to load a manifest that names the service. This invocation will create a complete DSS node with core services. One of the services, the manifest loader, will examine the named manifest, e.g., "...\config\simpleservice.manifest.xml" and will iterate through it and construct the listed services. This node will listen at TCP port 8888: btmini-httpport 8888-manifest ... \config\simpleservice.manifest.xml.

Note that there are many other options for constructing services. This example specified a manifest of one service to be loaded when the node starts up. Alternatively, at runtime, a service could perform the same task by creating a manifest in a message and sending the message to the core Manifest-Loader services. If a service wishes to start a single other service, rather than a list of multiple services, it would simply send a message to the Constructor service and specify the name of the target service to be constructed. Not surprisingly, the ManifestLoader service composes with the Constructor service to perform its work.

The service is bound to http protocol and can be viewed by pointing a browser to, for example, http://[machine]:8888/ service. This will perform a "Get" action on the service and it will respond with "Hello World."

Example Computing Environment

Figure 10:
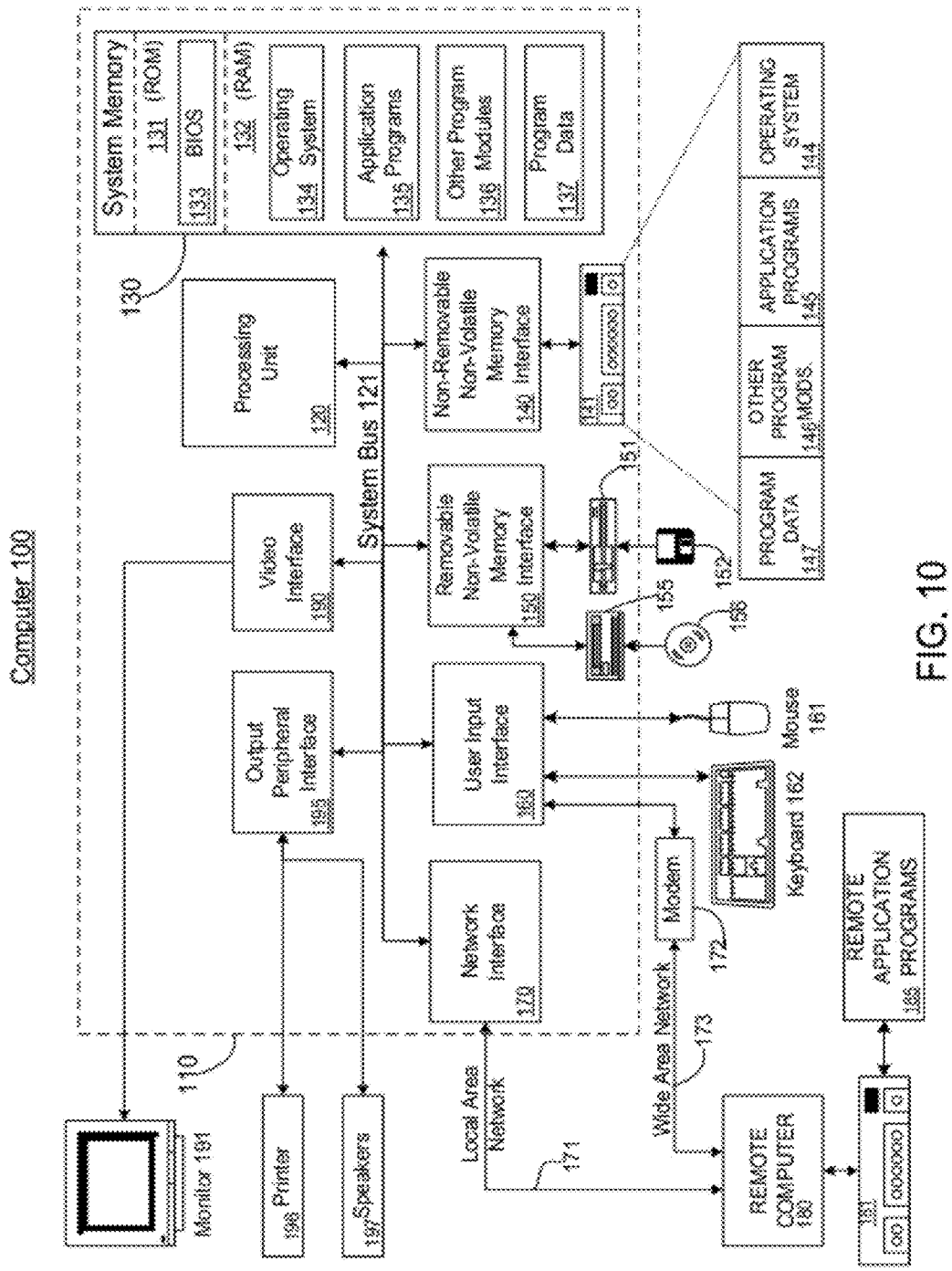
FIG. 10 is a block diagram showing an example computing environment in which aspects of the invention may be implemented.

FIG. 10 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 10 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 10, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 10 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10 provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

What is claimed:

1. A method comprising:
   deploying a software component in a decentralized distributed environment;
   defining a functionality associated with the software component;
   defining a current state of the software component;
   defining one or more relationships the software component has in place;
   dynamically assembling the software component, which comprises a limited function autonomous service, with other limited function software component services deployed in the decentralized distributed environment to compose a higher level distributed function; and
   communicating with the other limited function software components using sessionless asynchronous messaging incorporating a common concurrency runtime that provides a set of primitives for handling failures including faults and timeouts.

2. The method of claim 1, further comprising defining a globally unique reference to an instance of the software component.

3. The method of claim 1, wherein the current state of the software component is defined by a schema.

4. The method of claim 1, wherein the software component is adapted to be queried to determine its behavior.

5. The method of claim 1, wherein the software component is a fundamental service that is essential to functionality of another service.

6. The method of claim 5, wherein the fundamental service is at least one of a scheduler, directory, time management, and transport forwarder service.

7. The method of claim 1, wherein the software component is a common service that is not essential to functionality of another service but provides functionality that the other service may leverage.

8. The method of claim 7, wherein the common service is at least one of subscription management, leasing, and debugging.

9. The method of claim 1, further comprising sending messages to an externally addressable uniform resource identifier via a main port associated with the uniform resource identifier.

10. The method of claim 1, wherein the current state of the software component is defined by a set of data required to represent a current instance of the software component.

11. The method of claim 1, further comprising defining a name element that uniquely and globally identifies the software component.

12. A processor programmed with instructions to:
    deploy a software component in a decentralized distributed environment;
    define a functionality associated with the software component;
    define a current state of the software component;
    define one or more relationships the software component has in place;
    dynamically assemble the software component, which comprises a limited function autonomous service, with other limited function software component services deployed in the decentralized distributed environment to compose a higher level distributed function; and communicate with the other limited function software components using sessionless asynchronous messaging incorporating a common concurrency runtime that provides a set of primitives for handling failures including faults and timeouts.

13. The processor of claim 12, further configured to define a globally unique reference to an instance of the software component.

14. The processor of claim 12, wherein the current state of the software component is defined by a schema.

15. The processor of claim 12, wherein the software component is adapted to be queried to determine its behavior.

16. The processor of claim 12, wherein the software component is a fundamental service that is essential to functionality of another service.

17. The processor of claim 12, further configured to determine via the set of primitives including a coordination primitive how and when message reception will trigger a continuation method.

18. The processor of claim 17, further configured to specify that a first continuation method be used when a first type of message is received on a first port.

19. The processor of claim 12, further configured to send messages to an externally addressable uniform resource identifier via a main port associated with the uniform resource identifier.

20. The processor of claim 12, further configured to characterize a first failure as not receiving a response in a timely manner.

* * * * *